(12) United States Patent
Witkoff

(10) Patent No.: US 10,603,549 B2
(45) Date of Patent: Mar. 31, 2020

(54) MULTIPURPOSE LOW EMISSION SUBMERSIBLE ENGINE AND AQUATIC CRAFT USING SAME

(71) Applicant: Robert Steven Witkoff, Sedona, AZ (US)

(72) Inventor: Robert Steven Witkoff, Sedona, AZ (US)

( * ) Notice: Subject to any disclaimer, the term of this patent is extended or adjusted under 35 U.S.C. 154(b) by 0 days.

(21) Appl. No.: 15/973,488

(22) Filed: May 7, 2018

(65) Prior Publication Data
US 2018/0318650 A1 Nov. 8, 2018

Related U.S. Application Data

(60) Provisional application No. 62/502,640, filed on May 6, 2017.

(51) Int. Cl.
*B63H 20/14* (2006.01)
*B63H 23/00* (2006.01)
*A63B 35/12* (2006.01)
*B63H 21/14* (2006.01)
*B63H 21/36* (2006.01)
*B63H 21/32* (2006.01)
*F02B 75/02* (2006.01)
(Continued)

(52) U.S. Cl.
CPC ............... *A63B 35/12* (2013.01); *B63G 8/12* (2013.01); *B63H 21/14* (2013.01); *B63H 21/32* (2013.01); *B63H 21/36* (2013.01); *F02B 61/04* (2013.01); *F02B 75/02* (2013.01); *F02M 35/088* (2013.01); *F02M 35/165* (2013.01); *H02K 5/10* (2013.01); *H02K 5/12* (2013.01); *B63B 2758/00* (2013.01); *B63C 2011/028* (2013.01); *F02B 2075/027* (2013.01)

(58) Field of Classification Search
CPC ........ B63H 21/12; B63H 21/14; B63H 21/32; B63H 21/36; B63H 2021/12; F02B 61/04; F02B 75/02; F02B 2075/027; F02M 35/088; F02M 35/165; H02K 5/10; H02K 5/12; A63B 35/00; A63B 35/08; A63B 35/12; B63C 11/46
USPC ....... 440/75, 76, 78, 88 R, 88 A, 88 F, 89 R, 440/89 F, 89 H, 98; 114/312, 313, 315
See application file for complete search history.

(56) References Cited

U.S. PATENT DOCUMENTS

| | | | | |
|---|---|---|---|---|
| 4,294,779 A | * | 10/1981 | Alape | F02M 17/04 114/337 |
| 2013/0105012 A1 | * | 5/2013 | Stahle | F04D 15/0027 137/565.23 |
| 2018/0022431 A1 | * | 1/2018 | Lee | B63H 21/14 123/495 |

* cited by examiner

*Primary Examiner* — Daniel V Venne
(74) *Attorney, Agent, or Firm* — Invention To Patent Services; Alex Hobeon

(57) ABSTRACT

A low emission submersible engine is part of a multipurpose aquatic device, such as an aquatic craft or an electrical generator. A propulsion system having a propeller is coupled to the submersible engine to produce a swimmer propulsion machine and a generator is attached to the engine to produce an electrical generator. The submersible engine receives air from a snorkel that extends up above a water line. The aquatic device has a fuel reservoir which may receive liquid fuel or may receive a fuel cylinder. Floatation chambers keep the aquatic device afloat with the engine submerged. The exhaust assembly and exhaust ports from the engine may also be submerged and the exhaust ports may provide additional thrust. A propulsion system housing integrates the drive shaft and propeller, clutch coupler, exhaust conduits and water flow conduits and is detachably attachable to the engine.

9 Claims, 12 Drawing Sheets

(51) Int. Cl.
*F02M 35/16* (2006.01)
*F02M 35/08* (2006.01)
*H02K 5/12* (2006.01)
*H02K 5/10* (2006.01)
*F02B 61/04* (2006.01)
*B63G 8/12* (2006.01)
*B63C 11/46* (2006.01)
*B63C 11/02* (2006.01)

under water. An exemplary swimmer propulsion machine may have one or more handles for a person to hold onto and a throttle to control the speed of the swimmer propulsion machine through the water.

MULTIPURPOSE LOW EMISSION SUBMERSIBLE ENGINE AND AQUATIC CRAFT USING SAME

CROSS REFERENCE TO RELATED APPLICATIONS

This invention claims the benefit of U.S. provisional patent application no. 62/502,640, filed on May 6, 2017 and entitled Low Emission Engine And Aquatic Craft Using Same; the entirety of which is hereby incorporated by reference herein.

BACKGROUND OF THE INVENTION

Field of the Invention

The invention relates to a multipurpose low emission submersible engine that may be used as part of a propulsion machine having a propeller and/or an electrical generator.

BACKGROUND

Recent regulations regarding emission output for marine vehicles and aquatic craft have been tightened by the Environmental Protection Agency (EPA), making conventional two stroke engines unable to meet the standard. Further details of the engine classifications, as well as the emission standards are incorporated by reference from U.S. provisional patent application No. 62/502,640. The requirement is now no more than 30 ppm of nitrogen oxide (NOx) emission. Small aquatic crafts, such as swimmer propulsion machines having limited size and weight requirements may have a very difficult challenge meeting these emission requirements. Some aquatic crafts have moved to battery operated systems but these have limitations in range and power.

Many boat owners run their main engines in order to keep their batteries charged. This produces exhaust that can blow back into or around the boat and make it very unpleasant. There exists a need for a generator system that can be used to charge batteries and power electronic devices that is quiet and produces reduces exhaust.

SUMMARY OF THE INVENTION

The invention is directed to multipurpose low emission submersible engine that may be used as part of a propulsion machine having a propeller and/or an electrical generator. An exemplary aquatic device of the present invention comprises a submerged engine, such as a two or four stroke engine, that receives air from above the water level. An exemplary aquatic device comprises a snorkel that extends up above the water level to draw air into the engine for combustion. An exemplary aquatic device is a swimmer propulsion machine that comprises a propeller coupled to the crank shaft of the engine and handles for a person to hold onto as the swimmer propulsion machine pulls them through the water in a swimming position, extended with their head toward the direction of travel and their body floating behind. An exemplary aquatic device is an electrical generator having a rotor of the generator coupled to the crank shaft of the submersible engine. A pair of wires extends from the generator to provide electrical power to an electronic device, such as a battery for charging. In an exemplary embodiment, the aquatic device is convertible from a propulsion machine to a generator by changing out assemblies coupled with the engine.

An exemplary multipurpose aquatic device comprises a low emission submersible engine comprising, a fuel intake for receiving a fuel and an air inlet coupled to a snorkel that extends to an air inlet end that is configured above a water level for receiving air. The snorkel may be fluidly connected to allow a flow of air into a floatation chamber and then into the carburetor.

An exemplary multipurpose aquatic device comprises a combustion engine comprising a cylinder for receiving the fuel from the fuel tank and air. The two components mix in the combustion chamber and are ignited by a spark, such as from a spark plug, and this drive the piston in the cylinder within the cylinder. The piston is coupled with a crank shaft that rotates as the piston moves within the cylinder. The engine is configured within a case that is water tight, whereby water is prevent from entry through the case to effectively enable the engine to operate while submerged. An exemplary engine is a two or four stroke engine, however to meet the emission requirements of no more than 30 pmm NOx, a four-stroke engine is preferred. An exemplary engine may comprise one or more cylinders depending on the power requirements but one to two is preferred for small aquatic craft such as the swimmer propulsion machine described herein.

An exemplary engine, as described herein may be used to power an aquatic craft, such as a swimmer propulsion machine. The aquatic craft comprises a propulsion system that is connected to the engine and comprises a propeller that is coupled with the crank shaft of the engine. The propeller may be coupled to a drive shaft that is coupled to the crank shaft via a clutch. The propeller spins as the crank shaft spin during operation of the engine. The clutch may be used to disengage the propeller from the crank shaft to allow the aquatic craft to pause in the water with the engine running. Furthermore, an aquatic craft may comprise an exhaust assembly for emitting exhaust from the submersible engine. The exhaust assembly may comprise exhaust outlets that are also submerged under a water level and configured to emit exhaust in a direction substantially opposing propulsion direction, thereby providing additional thrust. In an exemplary embodiment, the propulsion system is detachably attachable to the submersible engine.

The exemplary aquatic craft may further comprise a floatation chamber for keeping the submersible engine submersed under the water. The aquatic craft may be a swimmer propulsion machine have the propulsion system may comprises handles for a person to hold onto along with a throttle to control the speed of the swimmer propulsion machine through the water. An exemplary swimmer propulsion machine may comprise one of more floatation chambers and one or more fuel reservoirs. In an exemplary embodiment, the body of the swimmer propulsion machine comprises a central body portion and two side portions configured on opposing sides of the central body portion. The floatation chamber may be configured in one or both of the side portions and/or the central body portion. Also, a fuel reservoir may be configured in the central body portion and/or one or both of the side portions. A side portion may be configured to receive a fuel cylinder, such as a propane tank and a fuel cylinder interface may couple with the cylinder outlet valve to fluidly couple the fuel cylinder with the engine fuel intake. The side portions may be cylindrical in shape.

An exemplary snorkel may couple with a first floatation chamber and an air connection conduit may couple the first floatation chamber with a second floatation chamber. A carburetor air intake may be configured proximal to a top inside surface of the second floatation chamber, such as within 5 mm or less of the top, or within 10 mm or less of the top, for example. This arrangement may reduce the likely hood of water getting into the carburetor. In addition, a water prevention valve may be configured on the air connection conduit and/or on an air intake conduit extending to the carburetor from a chamber to prevent water reaching the carburetor. A water connection conduit may also extend between the two floatation chambers to allow more volume of water to be retained before the first floatation chamber is filled; to disperse the water between the chambers and reduce the floatation water level in each.

The body of the swimmer propulsion machine may have a length of about 30 cm or more, about 40 cm or more, about 50 cm or more, about 75 cm or more, or no more than 1 m. The body of the swimmer propulsion machine may have a width of about 20 cm or more, about 30 cm or more, about 40 cm or more, about 50 cm or more, or no more than 75 cm. The body of the swimmer propulsion machine may have a height of about 10 cm or more, about 20 cm or more about 24 cm or more, about 50 cm or more, or no more than 75 cm.

An exemplary engine, as described herein may be used to power an electrical generator. An exemplary generator assembly may be attached to the submersible engine, wherein the generator assembly comprises a generator housing that is water tight, an electrical generator configured in the generator housing and that is submersible under a water level and a rotor coupled to the crank shaft of the engine. The electrical generator produces electricity when the crank shaft spins, which spins the rotor with respect to a stator. The electrical generator is cooled by being submersed below a water level thereby preventing the need for a cooling system. An exemplary generator assembly further comprises charging wires extending from the generator for connection to an electrical device to receive electricity produced by the electrical generator. An exemplary generator assembly is detachably attachable to the submersible engine. An exemplary generator assembly further comprising a floatation chamber for keeping the submersible engine and generator submersed under a water level. An exemplary generator assembly further comprise an exhaust assembly to direct the exhaust from the engine to an exhaust port. The exhaust port may be configured under the water level or may be submerged. An exemplary generator assembly and engine may be both submerges along with the exhaust assembly thereby reducing noise and fumes from the exhaust.

An exemplary aquatic device of the present invention may comprise a submersible engine as described herein and may be configured to receive a detachably attachable propulsion system and generator assembly as described herein, thereby making the aquatic device a multipurpose aquatic device. The propulsion system and generator may bolt onto or otherwise couple with the engine to interchange the devices.

A low emission engine may be a conventional internal combustion engine including a two stroke, a four stroke or a stratified charge engine. An exemplary engine comprises cylinders for receiving a fuel and a piston that moves within the cylinder to compress the fuel. The cylinder is coupled with a drive shaft that rotates as the piston moves up and down. An exemplary engine may be lubricated with a wet sump, a dry sump, a modified dry sump or a lubricant propane additive that is added to the fuel. Any suitable fuel additive may be used including those from Chemtane and Amsoil, or other lubricating fuel additives including any of the components therein. A lubricated fuel additive may be synthetic or a natural, refined oil. A dry sump, as described herein comprises two oil reservoirs and a pump to pump an engine lubricant back and forth between the two oil reservoirs. A wet sump has only one pump and a single lubricant reservoir. A lubricated fuel additive may be synthetic or a natural refined oil. An exemplary modified dry sump, uses two lubricant reservoirs and pumps the lubricant from one reservoir through the crank case and into the other reservoir. The lubricant level in both reservoirs is maintained in equilibrium between the two reservoirs and within the crankcase.

An exemplary engine may utilize gasoline, propane, butane or natural gas as a fuel type. Some of these fuel types burn more cleanly than others and may be preferred fuels for low emission applications.

An exemplary engine of the present invention is a four-stroke engine that operates below the emission standards for marine engines, such as below 50 ppm, below 30 ppm or below 20 ppm. In an exemplary embodiment, the engine of the present invention is a propane or butane burning two-stroke engine that utilizes a fuel lubricant additive and/or a fuel emission additive. The fuel lubricant additive may include any of the active or major components of fuel lubricant additives commonly used. The fuel emission additive may include any of the standard additives and components used in fuel emission additives.

An aquatic craft may utilize any of the engine types as described herein and may be a boat, a jet ski, or a hand-held personal aquatic propulsion device. In an exemplary embodiment, the aquatic craft is a hand-held swimmer propulsion machine that is configured to propel a person through the water. A hand-held personal swimmer propulsion machine may have handles and a throttle for the person to control the speed. A swimmer propulsion machine may be configured to remain partially above the water, wherein the top of the body is above the water and the bottom of the body is below the water.

A low emission engine, as described herein, and an aquatic craft utilizing said low emission engine may produce low emission, such as less than about 50 ppm, less than about 40 ppm, less than about 30 ppm, less than about 20 ppm, less than about 10 ppm and any range between and including the emission levels listed, which includes the emission of NOx.

A floatation chamber may have an open volume of air and may comprise a buoyant material, such as foam or plastic material that is buoyant. In an exemplary embodiment, a floatation chamber comprises an open volume of air and is fluidly coupled with the snorkel and receives air from the snorkel. Air from the floatation chamber is fed to the engine, such as to the carburetor.

Engine Types

The present invention includes a variety of engine types including, but not limited to the following engine types as defined by Wikipedia:

A two-stroke, or two-cycle, engine is a type of internal combustion engine which completes a power cycle with two strokes (up and down movements) of the piston during only one crankshaft revolution. This is in contrast to a "four-stroke engine", which requires four strokes of the piston to complete a power cycle.

A two-stroke, or two-cycle, engine is a type of internal combustion engine which completes a power cycle with two strokes (up and down movements) of the piston during only one crankshaft revolution. This is in contrast to a "four-stroke engine", which requires four strokes of the piston to complete a power cycle. In a two-stroke engine, the end of the combustion stroke and the beginning of the compression stroke happen simultaneously, with the intake and exhaust (or scavenging) functions occurring at the same time.

Two-stroke engines often have a high power-to-weight ratio, power being available in a narrow range of rotational speeds called the "power band". Compared to four-stroke engines, two-stroke engines have a greatly reduced number of moving parts, and so can be more compact and significantly lighter A four-stroke engine (also known as four cycle) is an internal combustion (IC) engine in which the piston completes four separate strokes while turning a crankshaft. A stroke refers to the full travel of the piston along the cylinder, in either direction Conventionally, a four-stroke (petrol or gasoline) Otto cycle engine is fueled by drawing a mixture of air and fuel into the combustion chamber during the intake stroke. This produces a homogeneous charge: a homogeneous mixture of air and fuel, which is ignited by a spark plug at a predetermined moment near the top of the compression stroke.

In a homogeneous charge system, the air/fuel ratio is kept very close to stoichiometric, meaning it contains the exact amount of air necessary for a complete combustion of the fuel. This gives stable combustion, but it places an upper limit on the engine's efficiency: any attempt to improve fuel economy by running a lean mixture with a homogeneous charge results in unstable combustion; this impacts on power and emissions, notably of nitrogen oxides or $NO_x$.

A four-stroke engine (also known as four cycle) is an internal combustion (IC) engine in which the piston completes four separate strokes while turning a crankshaft. A stroke refers to the full travel of the piston along the cylinder, in either direction. The four separate strokes are termed:
 a. Intake: also known as induction or suction This stroke of the piston begins at top dead center (T.D.C.) and ends at bottom dead center (B.D.C.). In this stroke the intake valve must be in the open position while the piston pulls an air-fuel mixture into the cylinder by producing vacuum pressure into the cylinder through its downward motion.
 b. Compression: This stroke begins at B.D.C, or just at the end of the suction stroke, and ends at T.D.C. In this stroke the piston compresses the air-fuel mixture in preparation for ignition during the power stroke (below). Both the intake and exhaust valves are closed during this stage.
 c. Combustion: also known as power or ignition This is the start of the second revolution of the four-stroke cycle. At this point the crankshaft has completed a full 360 degree revolution. While the piston is at T.D.C. (the end of the compression stroke) the compressed air-fuel mixture is ignited by a spark plug (in a gasoline engine) or by heat generated by high compression (diesel engines), forcefully returning the piston to B.D.C. This stroke produces mechanical work from the engine to turn the crankshaft.
 d. Exhaust: also known as outlet. During the exhaust stroke, the piston once again returns from B.D.C. to T.D.C. while the exhaust valve is open. This action expels the spent air-fuel mixture through the exhaust valve A stratified charge engine is a type of internal combustion engine in which the fuel is injected into the cylinder just before ignition. This allows for higher compression ratios without "knock," and leaner air/fuel ratio than in conventional internal combustion engines. In an exemplary stratified engine, air is introduced in the cylinder prior to combustion.

Engine Lubrication:

The present invention may employ a variety of engine lubrication systems including a wet or dry sump or a lubricating fuel mixture. A wet and dry sump engine system is described by Wikipedia as follows:

A wet sump is a lubricating oil management design for piston engines which uses the crankcase as a built-in reservoir for oil, as opposed to an external or secondary reservoir used in a dry sump design.

Piston engines are lubricated by oil which is pumped into various bearings, and thereafter allowed to drain to the base of the engine under gravity. In most production automobiles and motorcycles, which use a wet sump system, the oil is collected in a 3 to 10 litres (0.66 to 2.20 imp gal; 0.79 to 2.64 US gal) capacity pan at the base of the engine, known as the sump or oil pan, where it is pumped back up to the bearings by the oil pump, internal to the engine.

A wet sump offers the advantage of a simple design, using a single pump and no external reservoir. Since the sump is internal, there is no need for hoses or tubes connecting the engine to an external sump which may leak. An internal oil pump is generally more difficult to replace, but that is dependent on the engine design.

A wet sump design can be problematic in a racing car, as the large g force pulled by drivers going around corners causes the oil in the pan to slosh, gravitating away from the oil pick-up, briefly starving the system of oil and damaging the engine. However, on a motorcycle this difficulty does not arise, as a bike leans into corners and the oil is not displaced sideways. Nevertheless, racing motorcycles usually benefit from dry sump lubrication, as this allows the engine to be mounted lower in the frame; and a remote oil tank can permit better lubricant cooling.

Small two-stroke engines, as for motorcycles and lawnmowers, use crankcase compression: the fuel mixture passes through the sump space in the crankcase. This precludes the use of both wet sump and dry sump systems, as excess oil here would contaminate the mixture, leading to excess oil being burned in the engine and so excessive hydrocarbon emissions. These engines are instead lubricated by petroil mixtures, where a carefully measured proportion of oil is added to the fuel tank (between 1:16 and 1:50 ratios). This oil is consumed immediately and entirely, so there is no need for a sump to collect and re-use it.

Four-stroke engines, as for almost all cars, and large two-stroke engines used in locomotives and ships can both use either wet or dry sumps. Large two-stroke engines do not use crankcase compression; instead a separate blower or supercharger is used, either a mechanical blower such as a Roots blower or a turbocharger.

A dry-sump system is a method to manage the lubricating motor oil in four-stroke and large two-stroke piston driven internal combustion engines. The dry-sump system uses two or more oil pumps and a separate oil reservoir, as opposed to a conventional wet-sump system, which uses only the main sump (U.S.: oil pan) below the engine and a single pump. A dry-sump engine requires a pressure relief valve to regulate negative pressure inside the engine, so internal seals are not inverted.

Engines are both lubricated and cooled by oil that circulates throughout the engine, feeding various bearings and other moving parts and then draining, via gravity, into the sump at the base of the engine. In the wet-sump system of most production automobile engines, a pump collects this oil from the sump and directly circulates it back through the engine. In a dry-sump, the oil still falls to the base of the engine, however instead of collecting in a reservoir-style oil sump, it falls into a much shallower sump, where one or more scavenge pumps draw it away and transfer it to a (usually external) reservoir, where it is both cooled and de-aerated before being recirculated through the engine by a pressure pump. Dry-sump designs frequently mount the pressure pump and scavenge pumps on a common crankshaft, so that one pulley at the front of the system can run as many pumps as the engine design requires. It is common practice to have one scavenge pump per crankcase section, however in the case of inverted engines (aircraft engine) it is necessary to employ separate scavenge pumps for each cylinder bank. Therefore, an inverted V engine would have a minimum of two scavenge pumps and a pressure pump in the pump stack.

The present invention may employ a variety of fuel types including, but not limited to, gasoline, propane, butane and fuel mixtures comprising a fuel lubricant additive and/or an emission control additive. An emission control additive may reduce emission gas through chemical reaction with the combustion product, for example. A fuel lubricant additive may be a synthetic material that lubricates the engine, thereby reducing the need for a wet or dry sump. An exemplary lubricating additive is Amsoil, available from Superior Wisconsin and is good for cold running conditions. In an exemplary embodiment, a little Amsoil, such as about 1 oz is used per about 15 oz of propane or at ratios of about 50:1 about 100:1, or about 150:1 of fuel to Amsoil.

Chemtane 2 is an environmentally friendly product developed to meet the global need for a safer, more economical cutting and heating fuel. Chemtane Energy LLC, Baytown, Tex. produces Chemtane 2 gas which is a new generation cutting fuel that is more economical, environment friendly, and safer than acetylene, propylene, and other fuel gases.

Gasoline, or petrol, is a mixture of volatile, flammable liquid hydrocarbons derived from petroleum and used as fuel for internal-combustion engines.

Propane is a three-carbon alkane with the molecular formula $C_3H_8$, a gas, at standard temperature and pressure, but compressible to a transportable liquid. A by-product of natural gas processing and petroleum refining, it is commonly used as a fuel for engines, oxy-gas torches, portable stoves, and residential central heating. Propane is one of a group of liquefied petroleum gases (LP gases). The others include butane, propylene, butadiene, butylene, isobutylene, and mixtures thereof.

Butane is an organic compound with the formula $C_4H_{10}$ that is an alkane with four carbon atoms. Butane is a gas at room temperature and atmospheric pressure Natural gas is a flammable gas, consisting largely of methane and other hydrocarbons, occurring naturally underground (often in association with petroleum) and used as fuel.

There are also two main differences in the way that LPG (Propane) and natural gas (Methane) are burnt. The first difference is in the energy content. LPG has a higher energy content than natural gas, with 93.2 $MJ/m^3$ vs 38.7 $MJ/m^3$. With this higher calorific value, less LPG is required to produce the same amount of heat.

Propane can also be used as fuel in portable lamps or heaters. In fact, propane can even serve as vehicle fuel, as long as it is mixed with substances such as propylene, butylene, and butane. When propane is mixed with these substances, it is termed as LPG, or liquefied petroleum gas.

An electronic device, as used herein is a device that is powered by electricity, such a radio, speaker, pump, and the like.

An aquatic craft, as used herein, is a craft that is propelled through the water, such as on the surface of the water.

The summary of the invention is provided as a general introduction to some of the embodiments of the invention and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 13 shows a front view of the body portion of an exemplary swimmer propulsion machine having a snorkel fluidly coupled with two floatation chambers and air and water connection conduits there between.

Figure 1:
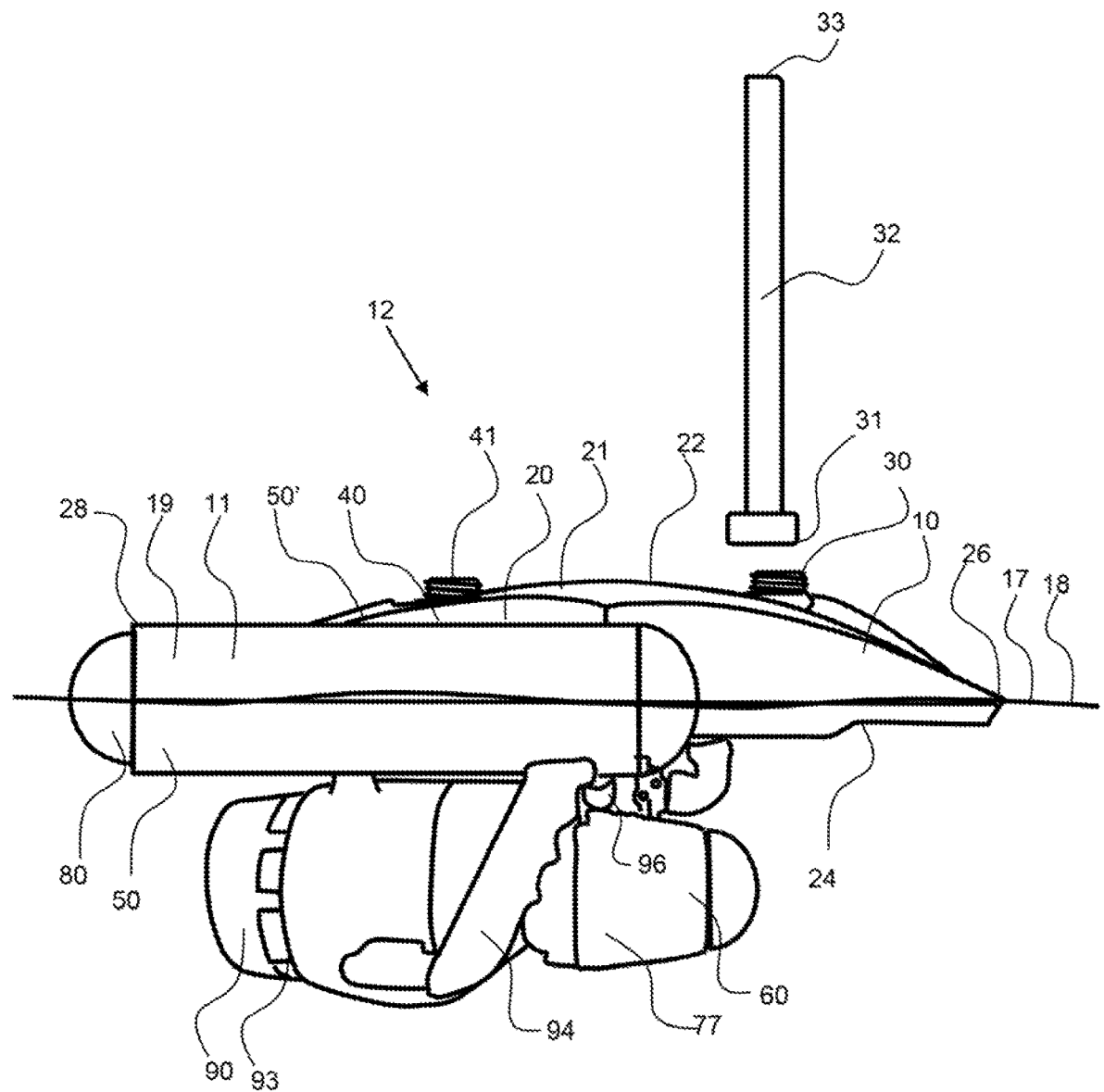
FIG. 1 shows a side view of an exemplary swimmer propulsion machine having a combustion engine attached thereto and a snorkel for drawing aid into the engine.

Corresponding reference characters indicate corresponding parts throughout the several views of the figures. The figures represent an Illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or device that comprises a list of elements is not necessarily limited to only those elements but may include other elements not expressly listed or inherent to such process, method, article, or device. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 5:
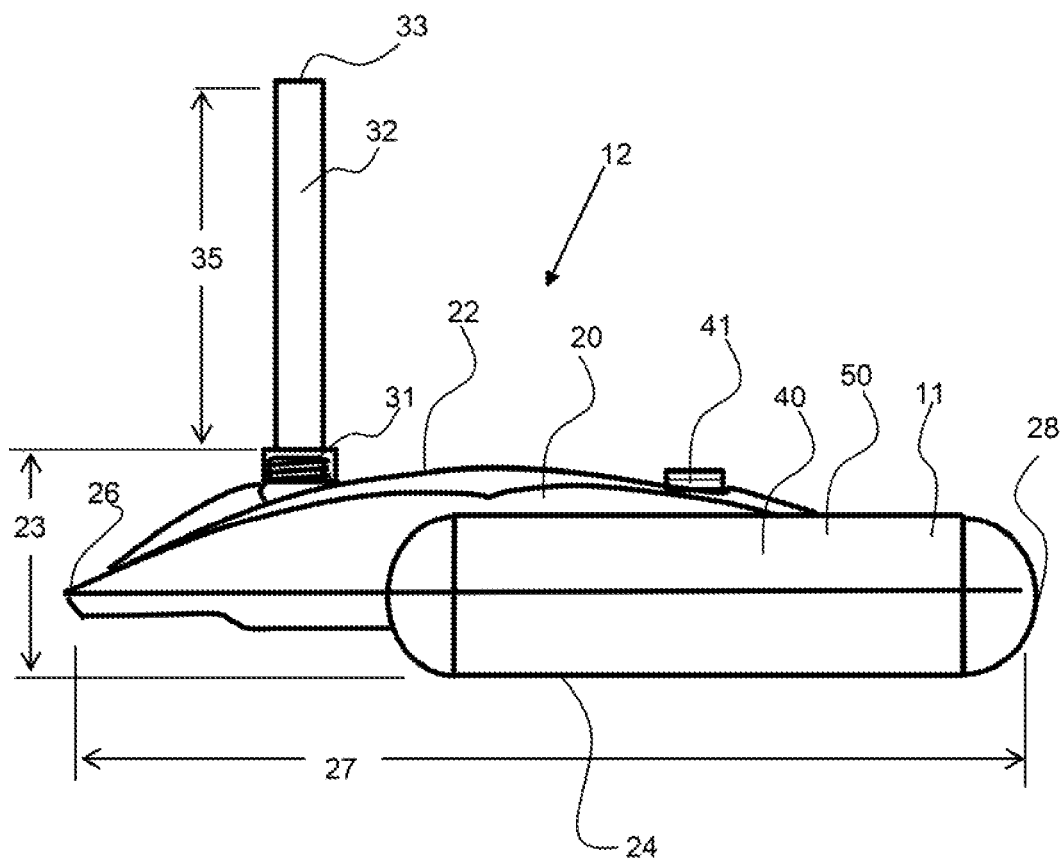
FIG. 5 shows a side view of the body of an exemplary swimmer propulsion machine.
Figure 6:
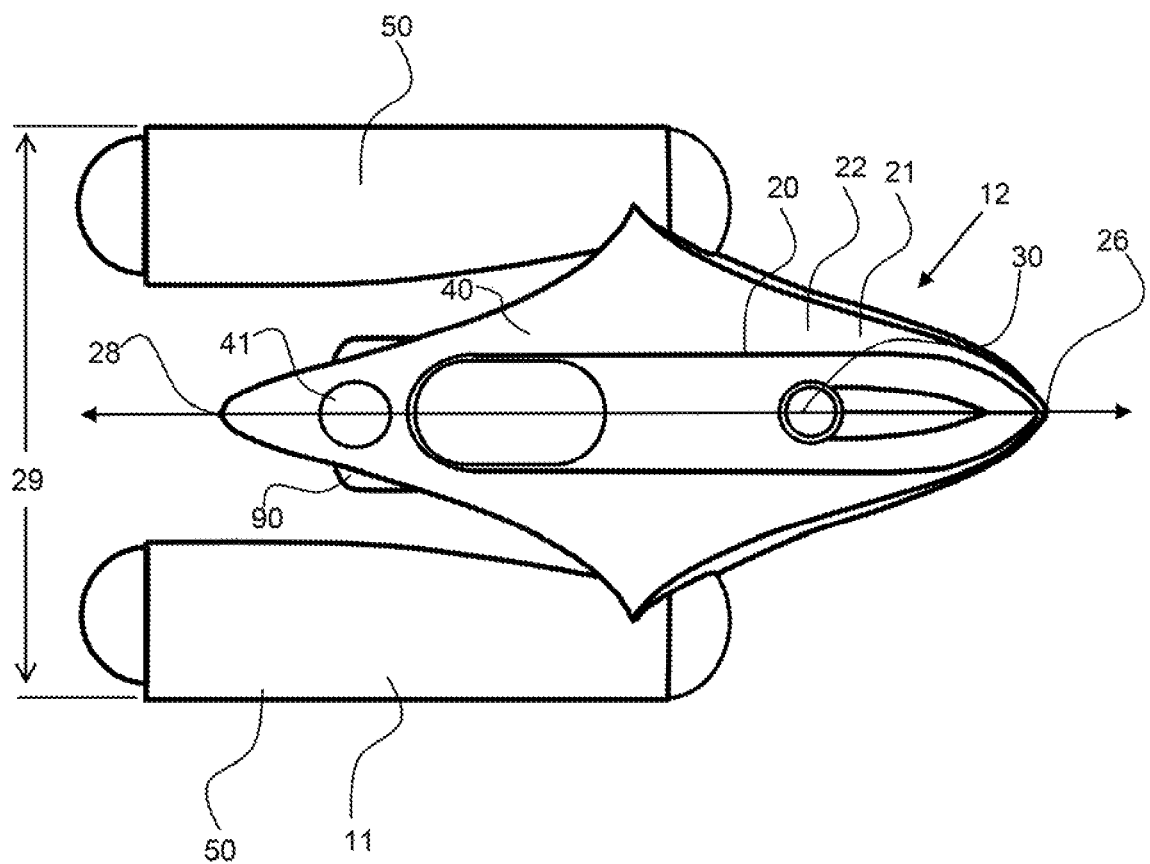
FIG. 6 shows a top view of an exemplary swimmer propulsion machine.
Figure 7:
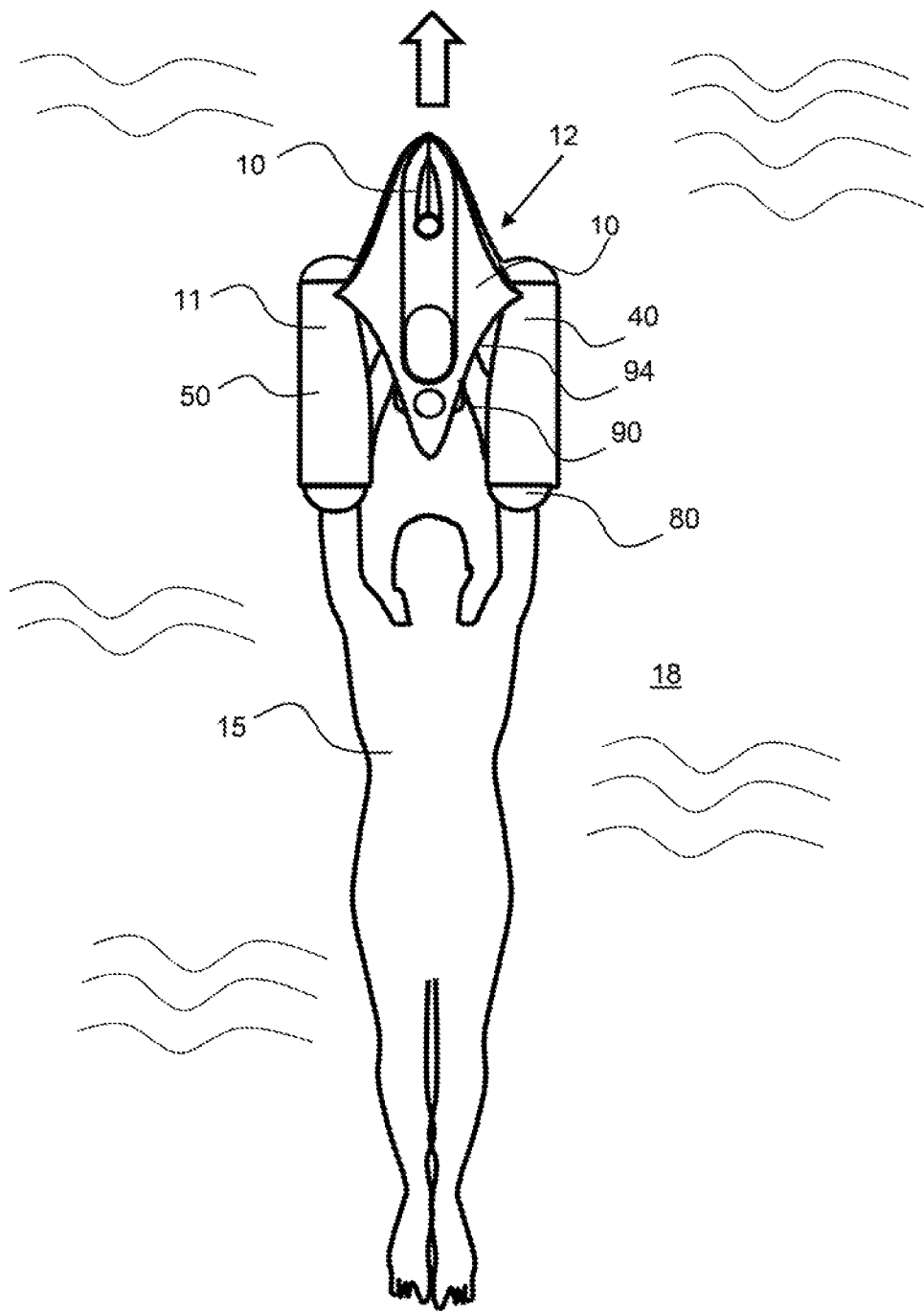
FIG. 7 a top view of an exemplary swimmer propulsion machine with a person being propelled through the water in a swimming position.

As shown in FIGS. 1 to 7, an exemplary swimmer propulsion machine 12 has a submersible engine 60 coupled to a body 20 for propelling a person through the water in a swimming position, as shown in FIG. 7. The body portion comprises at least one floatation chamber 50 to keep the aquatic device 11 afloat on the water 18. The aquatic craft 10 floats with the engine 60 submerged below the water level 17. A portion of the body 20 floats above the water level. A snorkel 32 is detached from the body 20 and extend from a connection end 31 to an air inlet end 33. The connection end 31 of the snorkel 32 is coupled with the air inlet 30 of the body portion 20. The snorkel being extended vertical for air intake reduces any water ingress into the snorkel and engine. The snorkel provides air to the combustion engine. The exemplary swimmer propulsion machine 12 has a fuel reservoir 40 and a fuel fill port 41. The fuel may be configured in a fuel cylinder 80 and this fuel cylinder may be detachably attachable to the exemplary swimmer propulsion machine 12. A propulsion system 90 propels a person through the water and comprises handles 94 and a throttle 96 for the person to control the speed of the swimmer propulsion machine 12. A propeller 93 is coupled to the engine 60 and is driven by the engine. The engine 60 is a combustion engine that has an engine casing 77 that is water tight, whereby substantially all water is kept out of the engine to effectively enable the engine to operate while submerged. The engine is a combustion engine and may be a two or four stroke engine and preferable produces less then 30 ppm NOx emissions, as this is now a requirement for aquatic engines. The body 20 has a central body portion and two side portions 19, 19' that may be cylinders for floatation chambers and/or fuel reservoirs. It is to be understood that some fuel reservoirs 40 may also be floatation chambers 50 when the fuel reservoir float, and especially when a compressed gas is used as a fuel, such as propane cylinder, as described in more detail herein.

As shown in FIG. 1, the body 20 has a central body portion 21 and two side portions 19, 19' (not shown). The engine is submerged below the water level 17. The snorkel 32 is detachably attachable to the body 20 which may allow snorkels of various lengths to be attached depending on how rough the water is.

Figure 2:
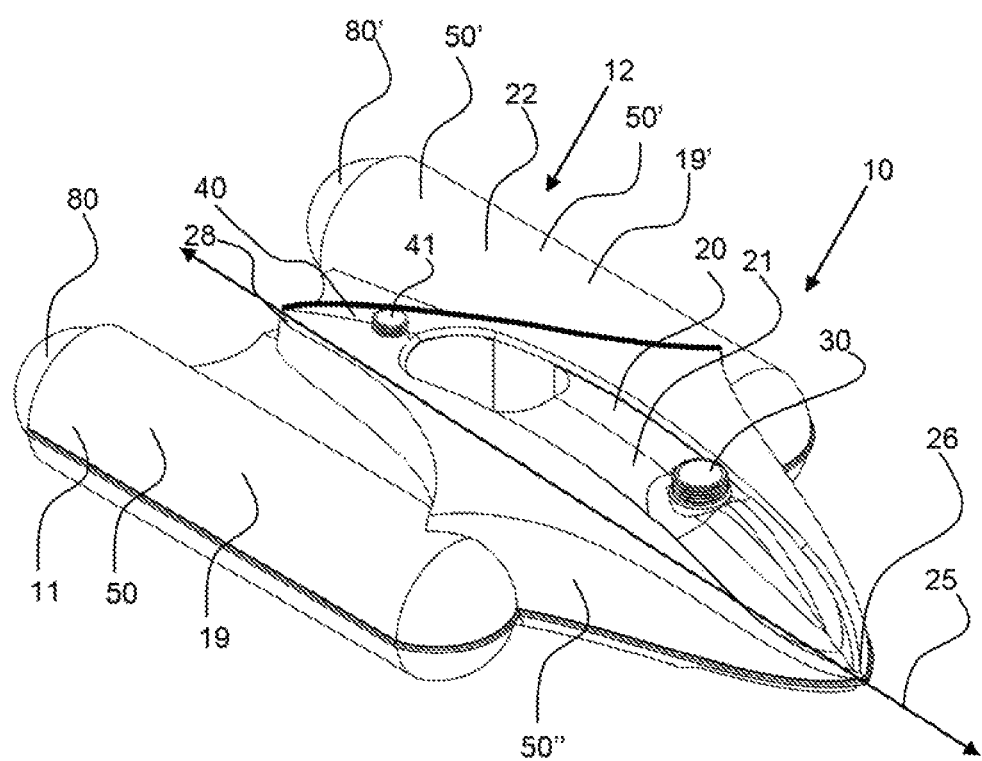
FIG. 2 shows a perspective view of an exemplary aquatic craft body, a body for an example swimmer propulsion machine, that is a hand-held personal aquatic device the can be used to propel a person through the water in a swimming position and comprises a combustion engine.

As shown in FIG. 2, the body 20 has a central body portion 21 and a side portions 19 and 19'. A fuel fill port 41 is configured in the body 20 to receive fuel. The fuel may be feed to one or more fuel reservoirs 40. A fuel reservoir may be configured in one or both side portions and/or in the body portion. The central body portion may also be a floatation chamber and/or may have a cavity of air and/or be made of a buoyant material, such as foam. The body is streamline along the centerline 25, from the front 26 to the back 28. The body is symmetric from side to side along the centerline as well. Water may flow up and over the top 22 of the body 20. A portion of the engine or propulsion system may extend up through the central cavity in the body and be detachably attached to the body.

Figure 3:
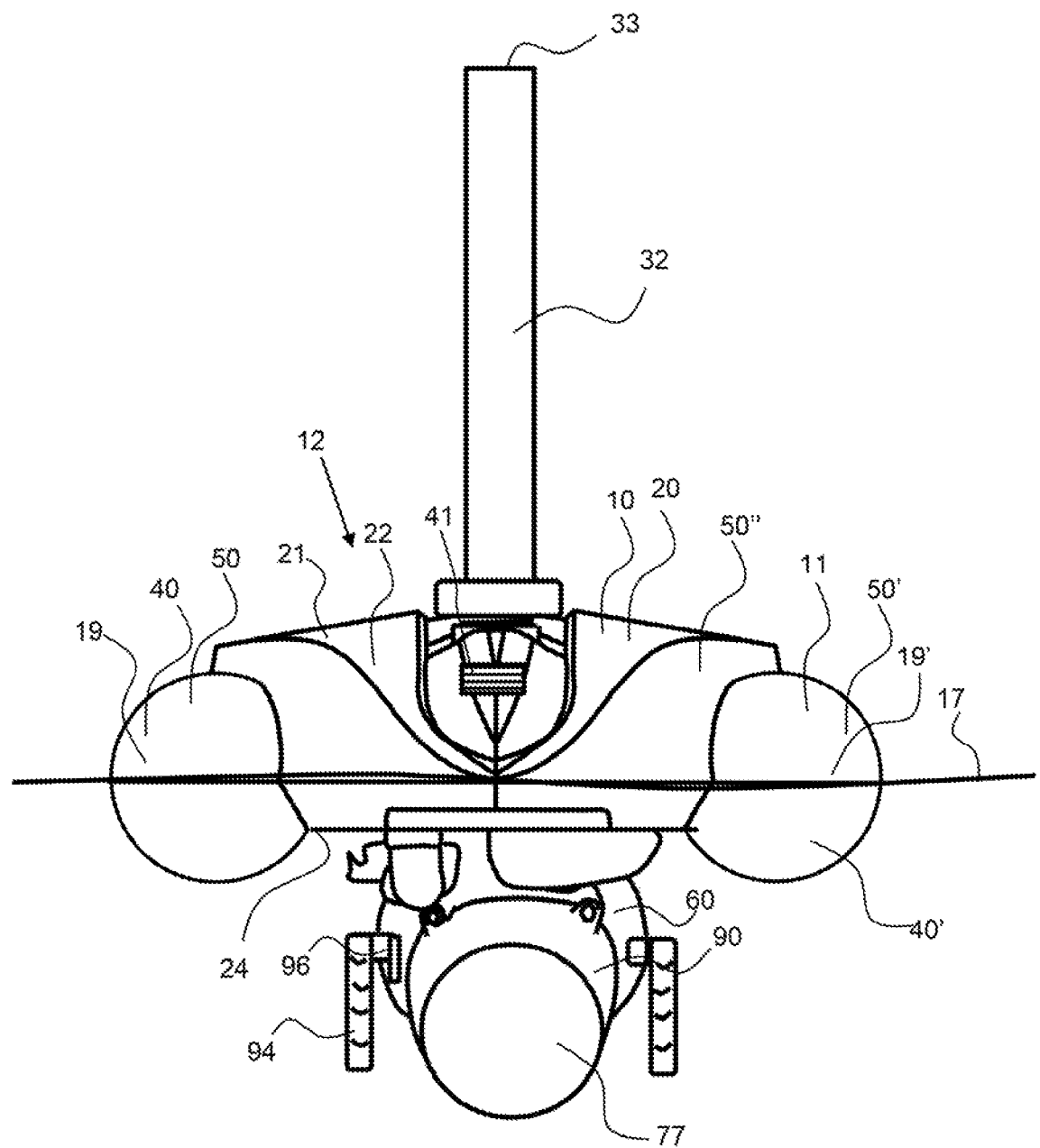
FIG. 3 shows a front view of an exemplary swimmer propulsion machine having a combustion engine attached thereto and a snorkel for drawing aid into the engine.

As shown in FIG. 3, an exemplary swimmer propulsion machine 12 has a combustion engine 60 attached thereto and a snorkel for drawing air into the engine. The propulsion system 90 comprises handles 94 and a throttle 96 for a person to control the exemplary swimmer propulsion machine 12. The two side portions 19, 19' of the body 20 help to keep the body stable in the water, especially in rougher water.

Figure 4:
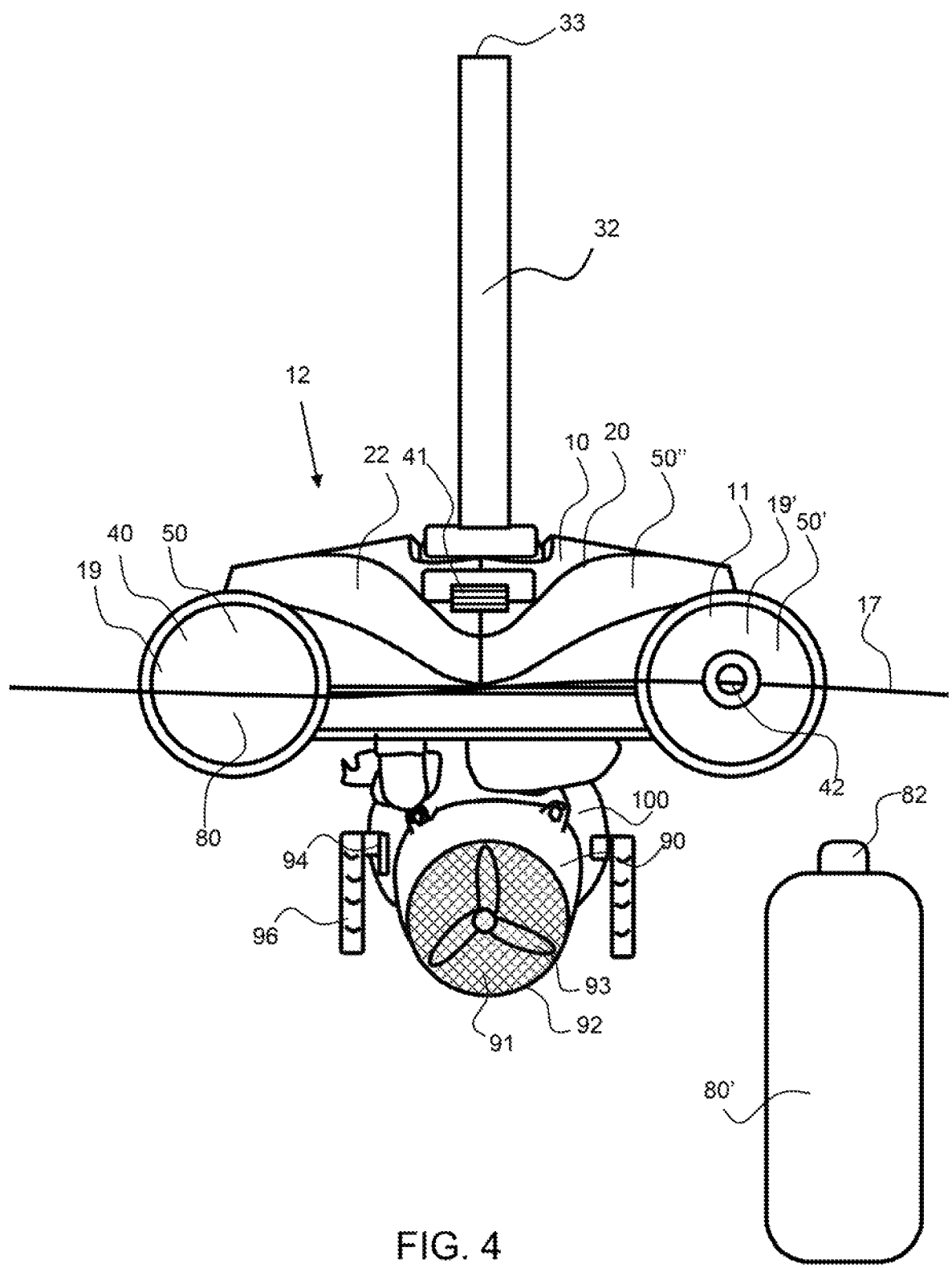
FIG. 4 shows a back view of an exemplary swimmer propulsion machine having a propeller that is part of a propulsion system and an exhaust assembly.

As shown in FIG. 4, an exemplary swimmer propulsion machine 12 has a propeller 93 that is part of a propulsion system 90 and an exhaust assembly 100. The propeller is configured behind a propeller guard 91 and within a propeller cover 92 that extends around the propeller. The exhaust system may comprise exhaust ports that emit exhaust back from the swimmer propulsion machine to provide additional thrust. As shown in FIG. 4, the two side portions 19, 19' are configured to receive a fuel cylinder 80, such as a cylinder of compressed propane. A fuel cylinder 80 is slide into the cylinder of side portion 19 and side portion 19' is empty, thereby showing the fuel cylinder interface 42 that fluidly couples the fuel cylinder with the fuel intake. An exemplary fuel cylinder 80' has an outlet valve 82 that is opened when the fuel cylinder is slide into and coupled with the fuel cylinder interface 42.

FIG. 5 shows a side view of the body portion of an exemplary swimmer propulsion machine 12 having a length 27 from a front 26 to a back 28, a height 23 from a top 22 to a bottom 24 and a snorkel 32 having a length 35 from the air inlet end 33 to the connection end 31.

FIG. 6 shows a top view of an exemplary swimmer propulsion machine 12 having a width 29 from a left side to a right side.

As shown in FIG. 7, an exemplary swimmer propulsion machine 12 is propelling a person 15 through the water in a swimming position. The person is holding onto the handles 94 of the propulsion system 90.

Figure 8:
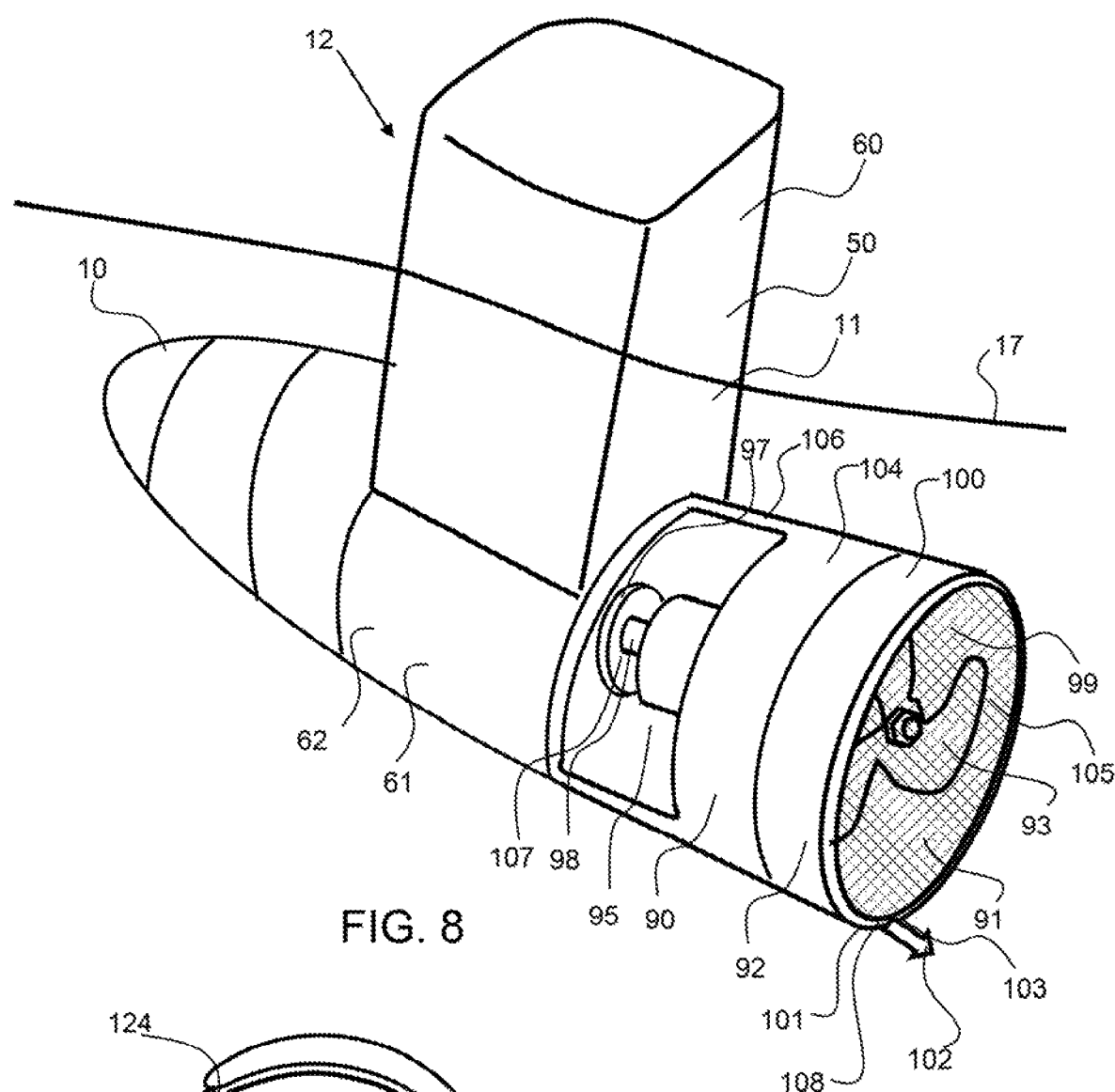
FIG. 8 shows a prospective view of the engine portion and propulsion system of an exemplary aquatic craft, such as a swimmer propulsion machine.

As shown in FIG. 8, an exemplary engine assembly 62 and propulsion system 90 are detached from the body of the swimmer propulsion machine. The aquatic craft 10 comprises a submersible engine 60 that is coupled with the propulsion system 90 to propel the aquatic craft through the water. The propeller 93 is coupled to a drive shaft 98 that is coupled with the crank shaft through a clutch coupler 107 that engages with the clutch to transfer torque to the drive shaft at a threshold revolutions per minute (RPM). The clutch coupler may extend around the clutch 97 that is coupled with the crank shaft.

The exhaust assembly 100 comprises an exhaust port 101 configured in the propeller cover 92 or propulsion housing 104 and emits exhaust 102, as indicated by the bold arrows, backward or in the opposing direction of motion to provide additional thrust. The exhaust 102 may flow in an exhaust conduit 103 that is configured in an annular space 108 between the outer surface of the propeller cover and inner surface of the propeller cover 92. The exhaust conduit may extend from the engine 60 to the annular space through one of the fins 106 extending from the connected end of the propulsion housing over the water inlets 95. Note that there may be a plurality of fins to avoid large objects entering the flow channel 99, however on a few are shown for ease of illustrating the components therein.

The exemplary ring-shaped propeller cover has an open flow channel 99 in the center area to channel water to the propeller 93. The propulsion housing 104 has water inlets 95 upstream of propeller to channel water into the flow channel 99 of the propeller cover. These water inlets may have a plurality of protective fins 106 to prevent large objects from entering the flow channel and damaging the propeller and to prevent injury. A propeller guard 91 extends over the open end of the flow channel, or water outlet 105, to protect people from injury. In an exemplary embodiment, a propulsion housing 104, includes the propeller cover, exhaust manifold or exhaust conduits, a propeller shaft assembly including the drive shaft 98 and propeller 93 and water ducting including the water inlets 95, open flow channel 99 and the water outlet 105 from the flow channel. This unique propulsion housing, having both propulsion and exhaust components configured therein is an integrated housing that enables quick and easy detachment and attachment of the propulsion system and exhaust assembly. The crankcase 61 is submerged below a water level 17.

Figure 9:
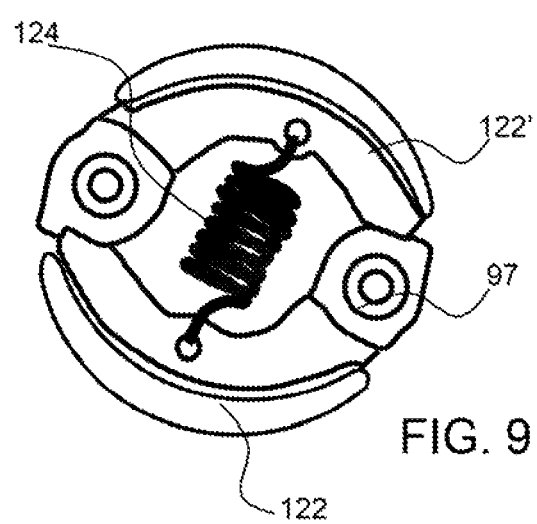
FIG. 9 show a top vies of an exemplary centrifugal clutch.

As shown in FIG. 9, an exemplary centrifugal clutch comprises a pair of clutch shoes 122, 122' coupled together by a spring element 124. The centrifugal clutch spins with the crank shaft and when the speed is high enough, the centripetal force of the clutch shoes elongates the spring and engages the drive shaft.

Figure 10:
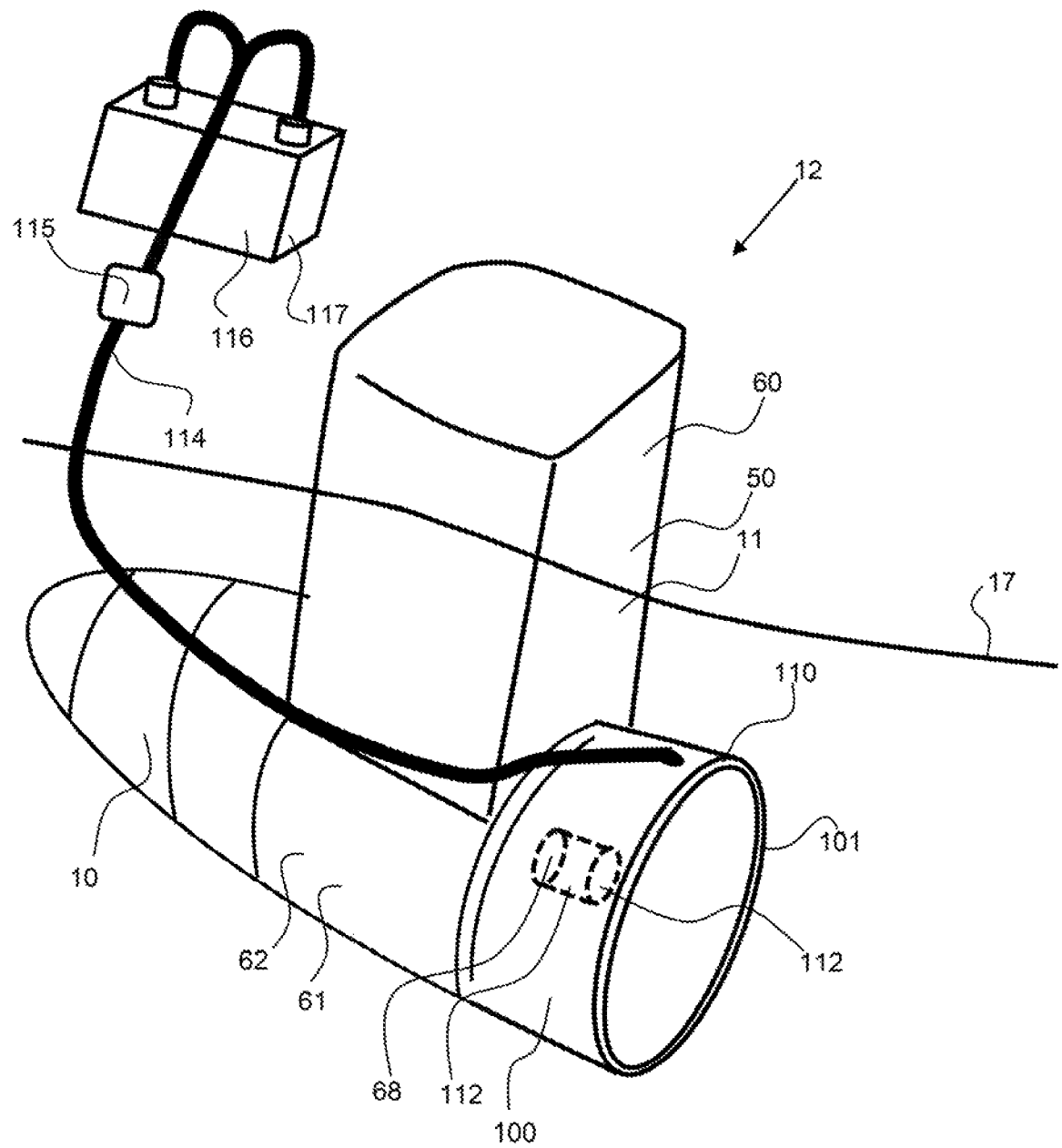
FIG. 10 shows a prospective view of the engine portion and generator assembly of an exemplary aquatic device.

As shown in FIG. 10, an exemplary engine assembly 62 and generator assembly 110 are detached from the body of the swimmer propulsion machine. The aquatic device 11 comprises a submersible engine 60 that is coupled with the generator assembly 110 to turn a rotor 112 of the generator assembly to produce electrical power. The rotor is coupled with the crank shaft and as the crank shaft spins the rotor spins with respect to a stator to produce electrical power. The exhaust assembly 100 comprises an exhaust port 101 configure to emit exhaust from the engine. The generator is cooled by water, as it is submerged below the water level 17. Wires 114 extend from the electrical generator 111 to an electrical device 116, a battery 117, for example. The wires may extend to an interconnect 115 and then to an electronic device, such as a battery. The electrical generator 111 produces electrical power that can be used to power and electrical device or charge a battery.

Figure 11:
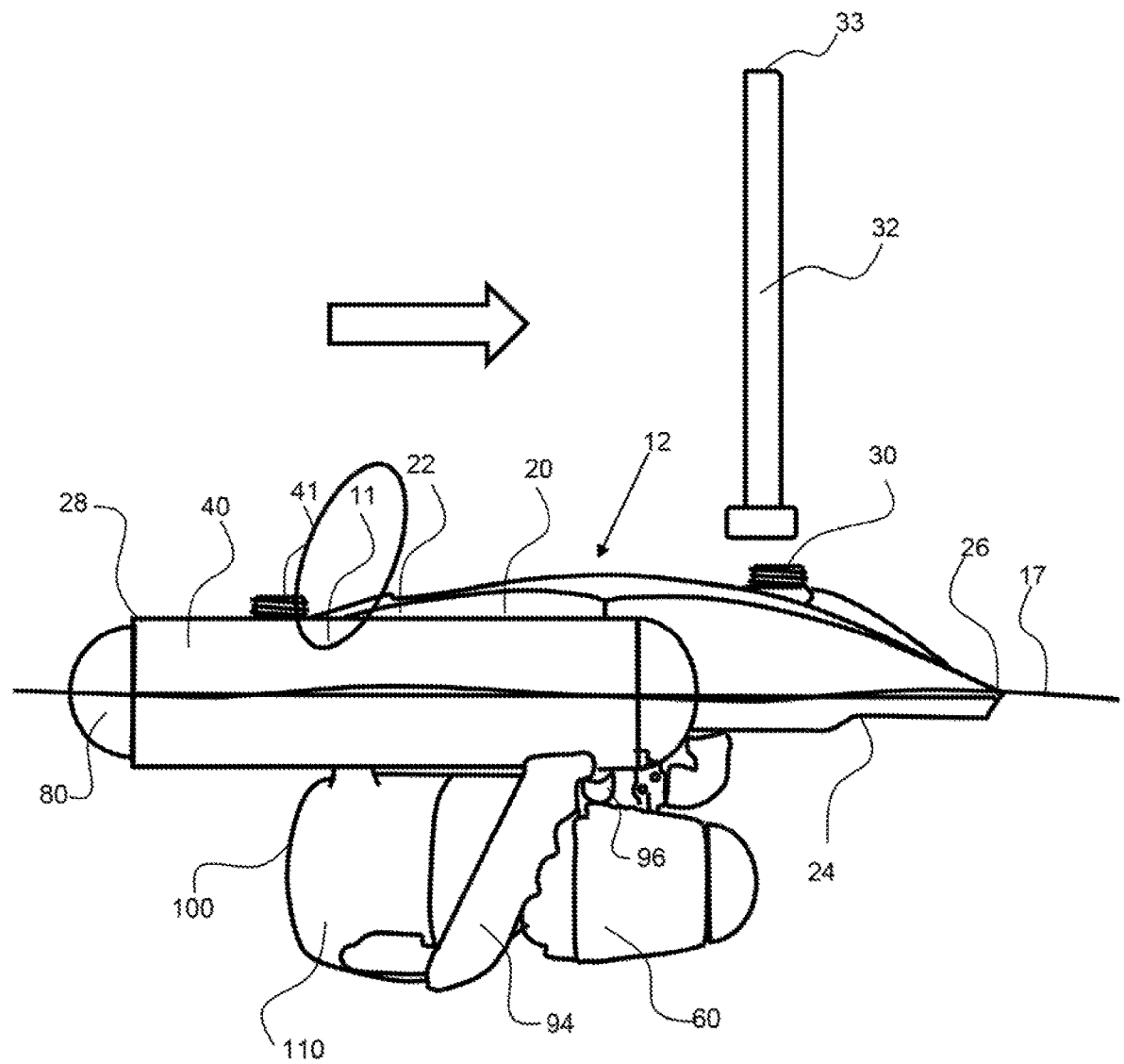
FIG. 11 shows a side view of an exemplary generator assembly attached to an exemplary aquatic device, a swimmer propulsion machine.

As shown in FIG. 11, an exemplary generator assembly 110 is attached to an exemplary aquatic device 11, a swimmer propulsion machine 12. As described herein, the propulsion system of the aquatic craft 10 may be detached and the generator assembly 110 may be attached to then engine to produce power.

Figure 12:
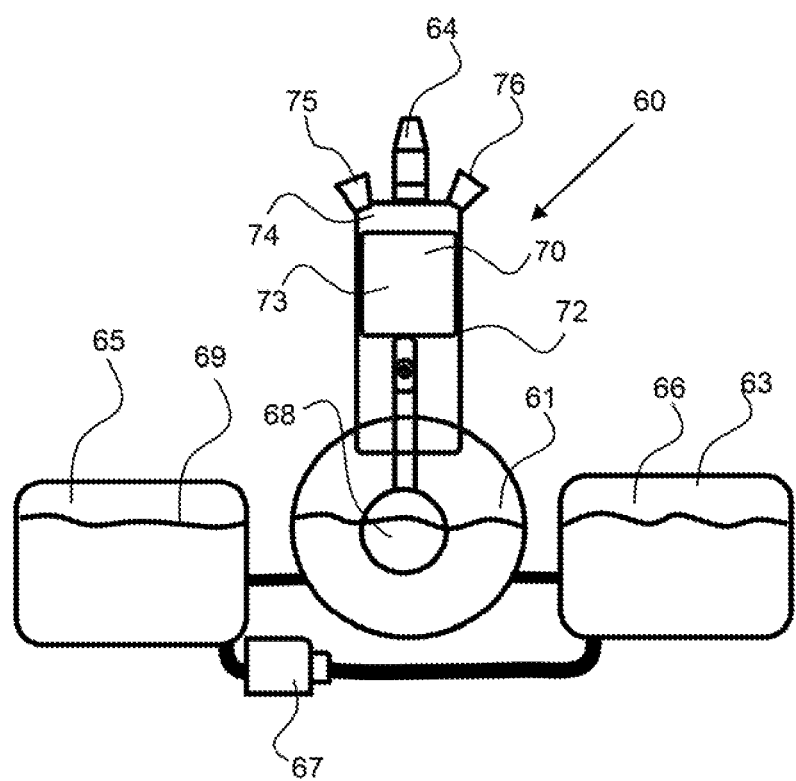
FIG. 12 shows a diagram of an exemplary engine having a modified dry sump with two lubricant reservoirs.

As shown in FIG. 12, an exemplary engine 60 has a modified dry sump 63 with two lubricant reservoirs, a first lubricant reservoir 65 and a second lubricant reservoir 66. A pump 67 is configured to circulate lubricant through the crankcase 61 from the reservoirs. The lubricant level 69 is shown in both chambers. The four-stroke engine 70, comprises a top fuel intake 75 and air intake 76. The piston 73 moves up and down within the cylinder 72 and a connecting rod couples the piston to the crank shaft 68. The fuel and air enter the combustion chamber 74 and the spark plug 64 ignites them to propel the piston downward and spin the crank shaft. It is to be understood that a spark plug, as used herein includes any spark producing device that may be used instead of a conventional spark plug.

Figure 13:
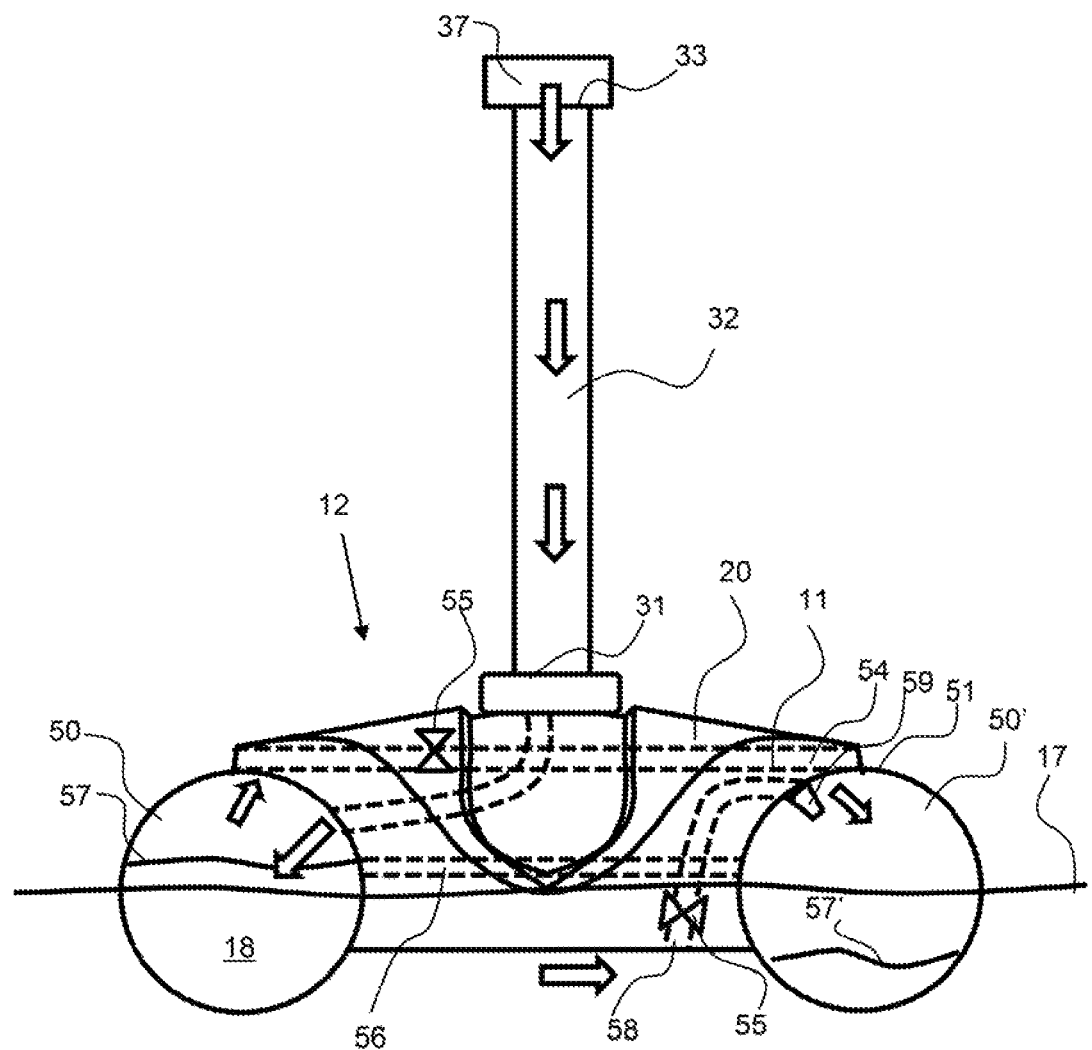

As shown in FIG. 13, an exemplary swimmer propulsion machine 12 has a snorkel 32 fluidly coupled with two floatation chambers 50, 50'. Air enters the snorkel through the air inlet end 33 and flows into the first floatation chamber 50. A water prevention device 37 may be configured with the snorkel to prevent water entry into the snorkel in the event of submerging to a dept below the air inlet end of the snorkel, such as a valve, or a float and value system. The air then flows through the air connection conduit 54 to the second floatation chamber 50'. A carburetor air intake port 59 is configured in the second floatation chamber, proximal to the top 51 of the second chamber and is coupled to the carburetor through the air intake conduit 58. The carburetor air intake port 59 is configured proximal the top of the second floatation chamber to prevent water getting into the carburetor. A water prevention valve 55 may be configured in the air connection conduit 54 and/or the air intake conduit 58 to prevent water 18 from flowing to the second floatation chamber. This system reduces the likelihood of water getting into the carburetor. A water connection conduit 56 may also extend between the two floatation chambers to allow more volume of water to be retained before the first floatation chamber 50 is filled; to disperse the water between the chambers and reduce the floatation water level 57, 57' in each.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A swimmer propulsion machine comprising:
a) a fuel reservoir for containing a fuel;
b) a multipurpose submersible engine comprising:
  i) a fuel intake for receiving said fuel from the fuel reservoir;
  ii) an air inlet coupled to a snorkel that extends to an air inlet end that is configured above a water level for receiving air;
  iii) a cylinder for receiving said fuel and said air,
  iv) a piston that moves within the cylinder to compress said fuel;
  v) a crank shaft coupled to the piston that rotates as the piston moves up and down within the cylinder;
  vi) an engine casing that is water tight;
  wherein the multipurpose submersible engine is a four-stroke engine;
  wherein the multipurpose submersible engine is operable submerged under said water level; and
  wherein the multipurpose submersible engine produces emission of nitrogen oxide of no more than 30 ppm;
c) a floatation chamber in fluid connection with the snorkel and comprising a carburetor air intake configured proximal to a top inside surface of the floatation chamber;

wherein water is prevented from entering the carburetors air intake as water received by the floatation chamber through the snorkel collects in a bottom of the floatation chamber;

d) a propulsion system attached to the submersible engine, wherein the propulsion system comprises:
  i) a propulsion housing having a connection end and an extended end;
  ii) a drive shaft coupled to the crank shaft;
  iii) a propeller coupled to the drive shaft and configured to propel the engine in a propulsion direction; and
  iv) a clutch configured between the crank shaft and the drive shaft.

2. The swimmer propulsion machine of claim 1, wherein the propulsion system comprises:
  a) a propulsion housing having a connection end and an extended end, wherein the propulsion housing comprises:
    i) a propeller cover extending around the propeller and forming a flow channel for directing water to the propeller;
    ii) water inlets upstream of the propeller to channel water into the flow channel;
    iii) a clutch configured to engage and disengage the propeller from the crank shaft:
wherein the drive shaft and propeller are attached to the propulsion housing.

3. The swimmer propulsion machine of claim 2, wherein the propulsion system comprises an exhaust assembly for emitting exhaust from the submersible engine.

4. The swimmer propulsion machine of claim 3, wherein the exhaust assembly is integrated into the propulsion housing wherein an exhaust conduit in configured in the propulsion housing, wherein the exhaust conduit extends in an annular space of the propeller cover.

5. The swimmer propulsion machine of claim 4, wherein the propulsion system is detachably attachable to the submersible engine.

6. The swimmer propulsion machine of claim 1, wherein the submersible engine is a dry sump engine and further comprises an oil reservoir and a pump that pumps the oil into a crank case.

7. The swimmer propulsion machine of claim 1, comprising two floatation chambers;
  wherein the snorkel is coupled with a first floatation chamber;
  wherein an air-connection conduit couples the first floatation chamber with a second floatation chamber; and
  wherein the carburetor air intake is configured proximal to a top inside surface of the second floatation chamber;
  wherein the first and second floatation chambers are configured on opposing sides of a center body portion.

8. The swimmer propulsion machine of claim 7, wherein a water-conduit extends between the first and second floatation chambers.

9. The swimmer propulsion machine of claim 1, further comprising:
  a) handles for a swimmer to grasp while being pulled through the water; and
  b) a throttle for manipulating the speed of the swimmer propulsion machine through the water.

* * * * *